United States Patent [19]
Beliveau et al.

[11] Patent Number: 5,247,487
[45] Date of Patent: Sep. 21, 1993

[54] SPATIAL MEASUREMENT RECOVERY SYSTEM

[75] Inventors: Yvan J. Beliveau; Eric J. Lundberg; Andrew Dornbusch; Timothy Pratt, all of Blacksburg, Va.

[73] Assignee: Spatial Positioning Systems, Inc., Blacksburg, Va.

[21] Appl. No.: 714,891

[22] Filed: Jun. 17, 1991

[51] Int. Cl.⁵ .............................................. G01S 15/00
[52] U.S. Cl. ...................................... 367/99; 367/907; 364/474.24
[58] Field of Search .................... 367/907, 87, 99, 8; 356/3; 364/516, 474.24, 474.05

[56] References Cited

U.S. PATENT DOCUMENTS

| | | | |
|---|---|---|---|
| 5,031,154 | 7/1991 | Watanabe | 367/8 |
| 5,121,333 | 6/1992 | Riley et al. | 364/474.05 |

Primary Examiner—Daniel T. Pihulic
Attorney, Agent, or Firm—Parkhurst, Wendel & Rossi

[57] ABSTRACT

A spatial measurement recovery system and method which determining the position, orientation, shape and/or operational characteristics of an environment. The system includes a data gathering apparatus and a model building apparatus. The data gathered may then be transformed into a CADD model of an as-built or as-is environment, or to otherwise map the environment in three dimensions.

13 Claims, 5 Drawing Sheets

SPATIAL MEASUREMENT RECOVERY SYSTEM

FIELD OF THE INVENTION

The present invention relates to a spatial measurement recovery system which determines and records the positional, dimensional and/or operational information regarding an object and/or an environment.

BACKGROUND OF THE INVENTION

Computer Aided Design and Drafting (CADD) has become a standard design tool for manipulating and recording design information in many industries, including the manufacturing and construction industries. In this way, design information, such as for a manufactured product or a construction project, is transformed into a computerized model. CADD models are accurate depictions of the position, shape and orientation of the objects composing the design, and their relationship to each other and the environment in which they are contained.

Beliveau et al, U.S. patent application Ser. No. 07/570,268, filed Aug. 17 1990, now U.S. Pat. No. 5,100,229 and Dornbusch et al U.S. patent application No. 07/636,459, filed Dec. 31, 1990, now U.S. Pat. No. 5,110,202 the contents of which are incorporated herein by reference, describes a system and method in which a CADD model is used in conjunction with a portable position sensor and a plurality of reference stations to position distinguished points in an environment. In the system and method disclosed by Beliveau et al., actual position and orientation information of a vehicle, for example, can be transmitted back to the computer and compared to the desired position of the vehicle in the CADD model, and then the position of the vehicle can be automatically corrected if necessary.

Unfortunately, a finished environment often differs from its design, due to problems such as errors in design and tolerance capability. Thus, there is a difficulty that the CADD model no longer accurately represents the environment constructed therefrom. CADD models could be used to record the "as-built" or "as-is" position, shape and orientation data of the components of an environment, for example, an existing manufactured product or industrial facility, if these data could be determined.

SUMMARY OF THE INVENTION

The present invention overcomes the above difficulty by providing a system and method which recovers the position and orientation (spatial data) and the shape and operational characteristics (descriptive data) of objects forming an environment. This data may then be transformed into a CADD model of the as-built or as-is environment.

The invention includes a data gathering apparatus and may also include a model building apparatus. The data gathering apparatus determines and records the position, orientation, shape and, if applicable, operational characteristics of objects. The model building apparatus transforms these spatial/descriptive data into a CADD model. When complete, this CADD model is an accurate depiction of the spatial relationships and descriptions of all objects within an environment. The modeled environment can then be viewed via a computer monitor or other output device.

The data gathering apparatus incorporates a position and measurement system, such as that disclosed in Beliveau et al. and Dornbusch et al. described above. The data gathering apparatus may also include a shape sensor which is capable of sensing the shape of objects. A separate operational characteristic sensor may also be included to measure any distinguishing operational characteristics, such as temperature or material composition, which aids in identifying a specific object from neighboring objects of similar shape. The data gathering apparatus collects any or all of the shape, position, orientation and operational data for any or all objects in an environment.

The spatial/descriptive data may be transferred to a model building apparatus either in real time through an on-line communication device, or at a later time from stored memory.

The shape and operational characteristics data permit the model building apparatus to identify objects. This identification may be achieved through comparison of the recovered descriptive data with detailed descriptive data of objects contained within software object libraries. Software object libraries would contain the descriptive data for some or all of the objects which are expected within a particular environment. For example, for an environment including a chemical processing plant, the software libraries would likely contain descriptive data for pipes, valves, pumps and the like, of many sizes and shapes. Once an object identification is made, the detailed descriptive data is placed in the CADD model using the corresponding spatial data provided by the data gathering apparatus. This reduces the amount of data collection required in the field to provide a detailed CADD model of that particular environment, and hence will reduce the time required to construct such models.

One preferred embodiment of the data gathering apparatus includes a hand-held rod. A touch sensor is attached to one end of the rod and senses when proper contact is made with an object. A shape sensor and an operational sensor are also attached to the rod. The shape sensor may include, for example, a sonar, while the operational sensor may include, for example, a thermometer. These sensors provide the descriptive data necessary for identification of objects. It is also necessary to know the azimuth and angle of inclination of the rod in order to properly determine the spatial data of objects. To this end, tilt sensors may be provided on the rod to determine the angle of inclination of the rod. Further, axial rotation data can be useful in determining orientation. The tilt sensors may also determine the axial rotation of the rod. Multiple positioning receivers allow the determination of both the azimuth and angle of inclination of the rod. A combination of tilt sensors and positioning receivers on the rod can be used.

According to a preferred embodiment of the method of the invention, the operator carries the data gathering apparatus, e.g., rod, and systematically places the touch sensor on the objects forming the environment. The spatial/descriptive data of each object is determined and stored. The data then may be transferred to a model building apparatus. The received shape and operational data are used to identify objects. Once an object is identified, its position and orientation are used to place the descriptive data for the object in the CADD model. These steps are repeated until all relevant objects of the real environment have been placed in the CADD model.

Simpler versions of the system and method of the invention are envisioned. For example, it is contemplated that an operator may input the shape and/or operational characteristics of the object being position, for example, 10" pipe, hot, directly into the model building apparatus. Then the position and orientation would be determined by the data collection apparatus. Once the corresponding position and orientation data are transmitted to the model building apparatus, the object can be included in the CADD model.

BRIEF DESCRIPTION OF THE DRAWINGS

The above aspects of the present invention can be seen from the attached drawings, in which.

DETAILED DESCRIPTION OF THE PREFERRED EMBODIMENTS

Figure 1:
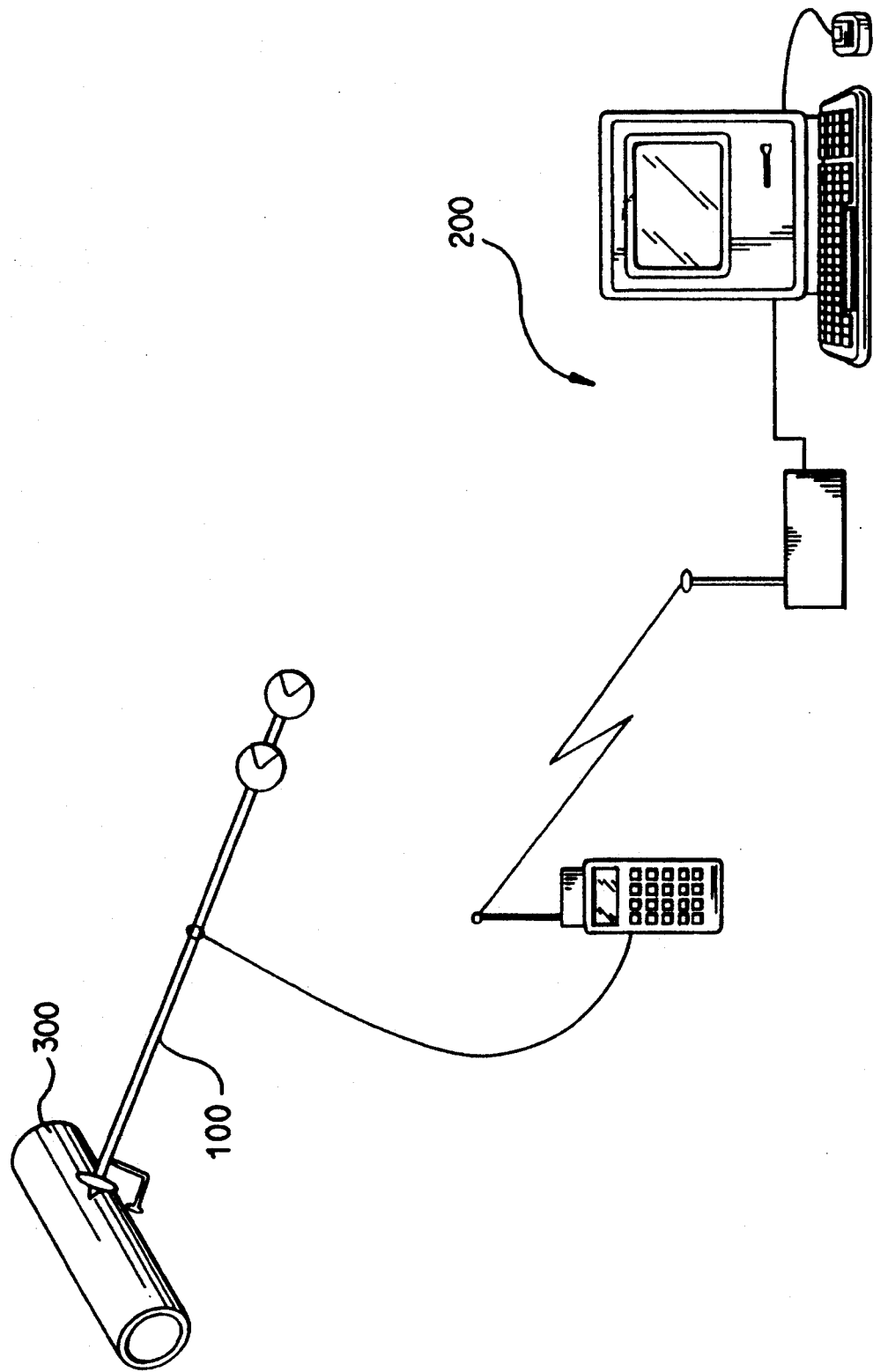
FIG. 1 is a schematic drawing of a data gathering apparatus in accordance with a preferred embodiment of the invention collecting data of an object.

A spatial measurement and recovery system in accordance with a preferred embodiment of the invention is shown in FIG. 1. Throughout the figures, like numerals are used to designate like elements.

The data gathering apparatus 100 gathers spatial/descriptive data of objects forming an environment for creating a "three-dimensional map" of the environment. A real time position determination system is integrated into the data gathering apparatus 100, as will be explained in more detail below. To this end, the data gathering apparatus includes one or more position sensors 110 (shown in FIG. 2).

Figure 2:
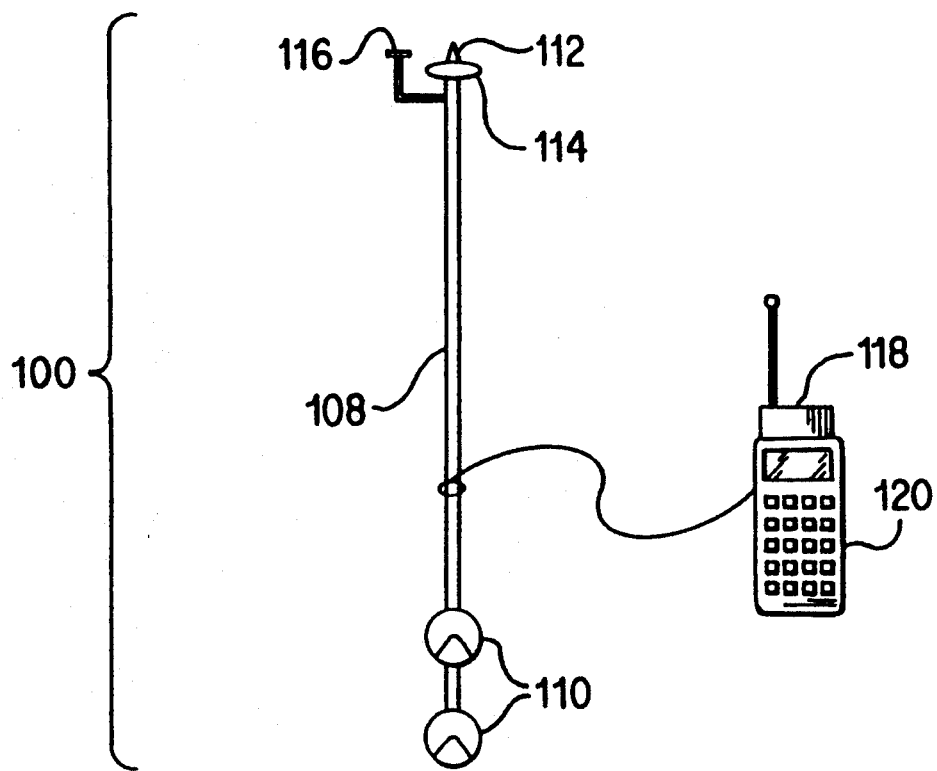
FIG. 2 is a schematic view illustrating the data gathering apparatus shown in FIG. 1.

One preferred embodiment of the data gathering apparatus as shown in FIG. 2 includes a rod 108 which is adapted to be hand held by an operator. It is contemplated that the rod may include flexible joints if the angular rotation of the joints is accounted for when determining position and orientation data. The operator places the tip of the rod 108 on an object for which data is to be gathered. Upon being placed on the object 300, the touch sensor 112 is triggered, which activates the computer/data storage device 120.

The computer/data storage device 120 is preferably connected to the rod via a communications link, such as via the cable shown in FIG. 2. Alternatively, the computer/data storage device 120 may be mounted on the rod itself. The computer/data storage device 120 serves as an interface for the operator to enter data and to calibrate the positioning system and sensors. The operator may also communicate descriptive data (i.e., shape and operational characteristic data) and spatial data (i.e., position and orientation data) via a communications link, for example, by voice over a "walkie-talkie" system (not shown), to another operator who inputs the data into another apparatus for storage and/or data manipulation. It is contemplated that the computer/data storage device 120 may also have the capability to store spatial data and/or descriptive data of objects itself.

The computer/data storage device 120 selectively activates a shape sensor 114 and an operational sensor 118. The shape sensor 114 can be of any suitable type which provides data which will distinguish the surface features of the object 300. The shape sensor 114 may also be capable of providing data regarding interior features. In one preferred embodiment, a sonar device may be used as the shape sensor 114. Such a sonar device could include one or more directional audio transducers and receivers (not shown). Directional audio signals would be aimed at different points on the object to determine the relative distance to the points. The distance to the points would give an indication of the shape of the object. In addition, a sounding device (not shown) in physical contact with the object 300 would transmit sound into the object and receive the resultant reflected sound. The sounding device may thus determine the thickness of materials composing the object at the point of contact. It is also envisioned that such a sounding device may be incorporated into the touch sensor 112.

The data gathering apparatus 100 may include an operational characteristic sensor 116. The operational characteristic sensor 116 determines one or more operational characteristics of the object 300. Such operational characteristics may be used to distinguish an object from neighboring objects of similar shape. Operational characteristics which could be used as distinguishing traits may include, for example, temperature, material composition, electrical current and/or color or the like. In one preferred embodiment in accordance with the present invention, a thermometer is used as operational characteristic sensor 116 to distinguish objects having unique operational temperatures or temperature ranges. In another preferred embodiment, a hardness testing device could be used as the operational characteristic sensor 116 to distinguish objects composed of outer materials having unique material hardness or material hardness ranges. In a further preferred embodiment, a magnetic flux detector could be used as the operational characteristic sensor 116 to distinguish objects carrying different electrical currents. In another preferred embodiment, a camera may be used as the operational characteristic sensor 116 to distinguish objects differing in color. It is to be understood that any desired operational characteristic and any corresponding operational characteristic sensor 116 may be used in connection with the system and method of the present invention.

Figure 4:
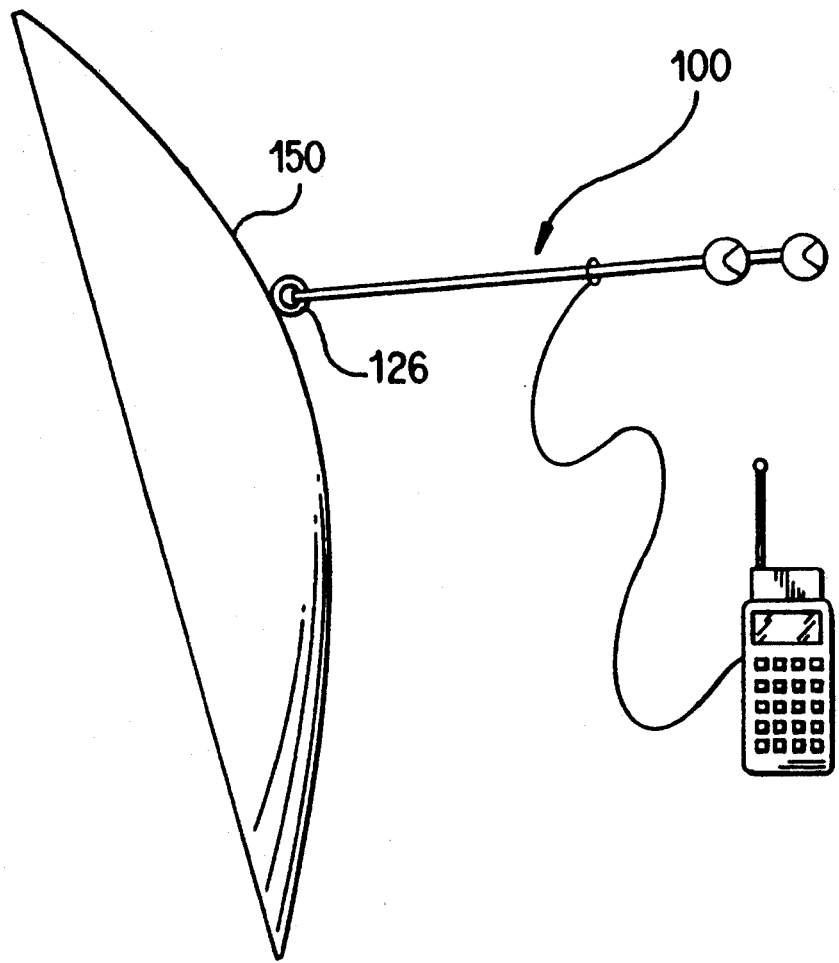
FIG. 4 is a schematic view illustrating the data gathering apparatus shown in FIG. 2 fitted with a wheel attachment for measurement of contoured surfaces in accordance with the invention.

The data gathering apparatus 100 may be fitted with various specialized attachments suitable for specialized data gathering. For example, as shown in FIG. 4, a wheel attachment may be used to enhance the gathering of data over contoured surfaces.

Figure 5:
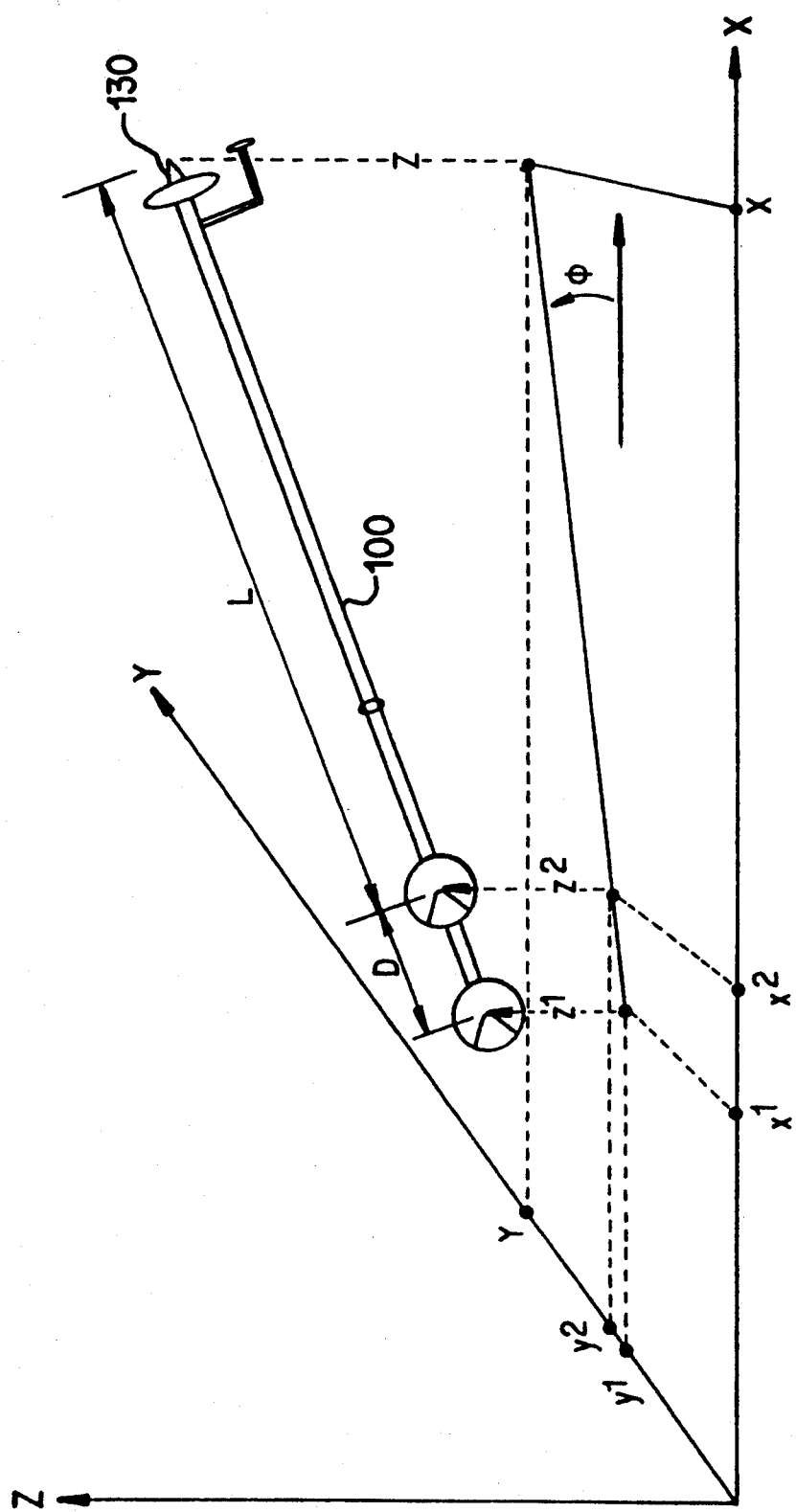
FIG. 5 is a schematic view illustrating the calculation of the position of the data gathering apparatus in accordance with the invention.
Figure 6:
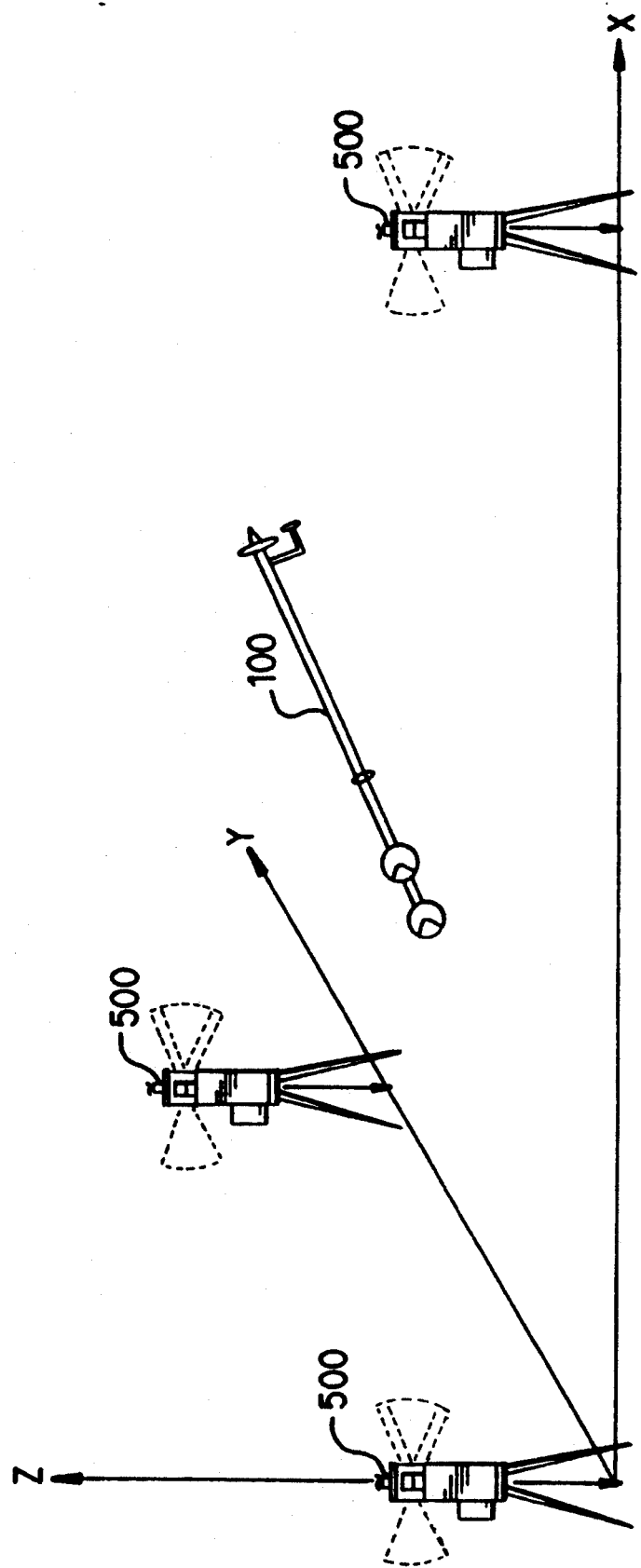
FIG. 6 is a schematic view illustrating a position and measurement system in conjunction with the data gathering apparatus shown in FIG. 2.

As shown in FIG. 5, two position sensors 110 may be attached along the axis of the rod. Two position sensors used in this manner will provide the minimum information necessary to determine the position of the tip 130 of the data gathering apparatus 100. In accordance with the invention, the position of the position sensors 110 along the rod 108 are determined in reference to at least two fixed stations 500, as shown in FIG. 6. Each fixed station preferably produces a set or multiple sets of counter-rotating beams which rotate at a constant angular velocity. Such counter-rotating beams can be produced using multiple rotating heads and strategically placed reflective surfaces, as shown in the Dornbusch et al. application referred to above.

Each fixed station 500 preferably includes a laser which produces at least one primary laser beam and at least one secondary beam which are counter-rotated about an axis. The primary laser beam has a predetermined angle of divergence (i.e., spread) which is inclined at a predetermined angle from the rotational axis. The secondary beam has the same divergence and may have the same inclination as the primary beam, but rotates in the opposite direction.

When the position sensor 110 is crossed by the two laser beams, a horizontal angle can be determined from the time difference between the time of crossing of the primary and secondary beams. Once these horizontal angles are known for three fixed stations 500, the point of intersection of three planes, and thus the three-dimensional position of the position sensor 110 can be determined.

Alternatively, if the fixed stations 500 each produce two primary laser beams and one or more secondary beams, only two fixed stations are required to determine the position of the position sensors 110 of the data gathering apparatus 100.

As shown in FIG. 5, once the position of the positioning sensors 110 have been determined, the position of the tip of the rod can be determined as follows:

$$X = L/D(X_2 - X_1) + X_2$$

$$Y = L/D(Y_2 - Y_1) + Y_1$$

$$Z = L/D(Z_2 - Z_1) + Z_1$$

The orientation of an object can be determined if the position of three non-colinear points on the object are known. When the data collection device touches an object, the location of a single point is determined by the positioning system employed in the data gathering apparatus 100. The position of additional points can be generated through analysis of the shape data determined by the shape sensor 114. The accuracy of the determined orientation will increase as the number of positions on the object from which the position data and shape data are taken increases.

Figure 3:
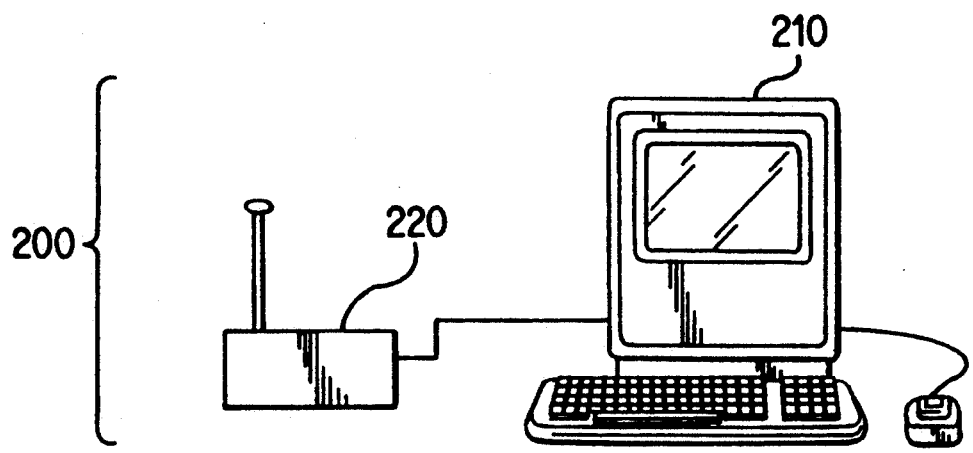
FIG. 3 is a schematic view illustrating a model building apparatus in accordance with a preferred embodiment of the invention.

Once the position, orientation, shape and operational characteristic data are determined, they are preferably immediately stored in the computer/data storage device 120, or sent to the model building apparatus 200 via the communication links 120 and 220, as shown in FIG. 3. The model building apparatus 200 stores the incoming spatial/descriptive data for the current object 300. The descriptive data is used to identify the object from a list of detailed descriptive data (e.g., actual design data) of previously recorded objects.

This list of detailed descriptive data is preferably in the form of software object libraries contained within the model building apparatus 200. Small distances can generally be accurately measured and precisely reproduced using commonly available instrumentation and tools, such as calipers, computer numerical controlled "CNC" machining equipment and the like. However, traditionally as the size of objects and the distance between objects increases, the ability to quickly and accurately measure these larger distances decreases. The object libraries of the model building apparatus 200 may contain the small dimensional information, such as the design shape data or production shape data, which is known to be accurate or which can be presumed to be accurate to the minimum accuracy required for the work at hand. In this way, the model building apparatus 200 can use the shape data provided by the data gathering apparatus to identify the data file in the object library which correspond to the object 300.

Alternatively, the operator performing the data gathering can enter an identification code for the object into the computer/data storage device or directly into the model building apparatus 200. This code would identify the appropriate descriptive data file without the need for analysis of the shape data of the object 300. The identification code could be a manufacturer's part number, a design component number or any code which uniquely identified the object 300.

Once the descriptive data for the object is determined, the model building apparatus 200 links the descriptive data to the position and orientation data generated by the data gathering apparatus 100.

In operation, an operator systematically places the data gathering apparatus 100 on the objects composing the environment in the spatial/descriptive data is desired. The spatial/descriptive date for each object is stored by the computer/data storage device 120. Alternatively, the spatial/descriptive data is directly transmitted to the model building apparatus 200. The model building apparatus 200 records the spatial/descriptive data, matches the descriptive data to the reference data contained within the object libraries and places the CADD image of the object in the CADD model of the environment.

The above is for illustrative purposes only. Modification can be made, particularly with regard to size, shape and arrangement of parts, within the scope of the invention as defined by the appended claims. For example, it is envisioned that position-reflectors or position-transponders could be used in place of the position sensors 110, wherein a position and measurement system would be employed in the data gathering apparatus 100 which gathers radiation emissions such as laser or radio beams at the transmitter.

Further, the invention is not limited to creating CADD models. It is also envisioned that the system and method of the invention can be used in navigational systems, for example, to allow robotic vehicles to navigate within their environments.

What is claimed is:

1. A spatial measurement recovery system for determining the position, orientation, shape and/or operational characteristic of an environment, comprising:

means for gathering data regarding at least one object forming the environment, said means for gathering data including at least one position sensor, wherein said means for gathering data is portable and includes a rod having at least one position sensor formed thereon; and means for manipulating the data gathered by said means for gathering data so as to create a map of the environment.

2. A system as in claim 1, wherein the means for manipulating the data is a computer which creates a CADD model of the environmment.

3. A method for determining the position, orientation, shape and/or operational characteristics of an environment, comprising the steps of:

systematically gathering spatial and descriptive data regarding objects forming the environment, including sequentially sensing at least three non-collinear points on each object;

manipulating the data gathered so as to create a map of the environment.

4. A method as in claim 3, wherein said step of manipulating the data includes:

storing the data in a model building apparatus;

matching any shape and operational characteristic data to reference data contained within object libraries in said model building apparatus so as to identify objects within the environment; and creating CADD images in a CADD model corresponding to the objects within the environment.

5. A spatial measurement recovery system for determining the position, orientation, shape and/or operational characteristic of an environment, comprising:

means for gathering data regarding at least one object forming the environment, wherein said means for gathering data includes a shape sensor and at least one position sensor which sequentially senses the position of at least three non-collinear points on each object; and means for manipulating the data gathered by said means for gathering data so as to create a map of the environment.

6. A system as in claim 5, wherein said shape sensor is a sonar device.

7. A spatial measurement recovery system for determining the position, orientation, shape and/or operational characteristics of an environment, comprising:

means for gathering data regarding at least one object forming the environment, said means for gathering data including at least one position sensor, wherein said means for gathering data includes an operational characteristic sensor; and means for manipulating the data gathered by said means for gathering data so as to create a map of the environment.

8. A system as in claim 7, wherein said operational characteristic sensor is selected from the group consisting of a thermometer, a hardness tester, a magnetic flux detector and a camera.

9. A system as in claim 1, wherein said rod includes a touch sensor.

10. A spatial measurement recovery system for determining the position, orientation, shape and/or operational characteristic of an environment, comprising:

means for gathering data regarding at least one object forming the environment, said means for gathering data including at least one position sensor which sequentially senses the position of at least three non-collinear points on each object; and means for manipulating the data gathered by said means for gathering data so as to create a map of the environment, wherein said means for manipulating data includes a model building apparatus having a computer workstation and a communications device, and wherein said means for manipulating data receives the position, orientation, shape and operation characteristics via said communications device from said means for gathering data and transforms these data into a computerized model of the environment.

11. A spatial measurement recovery system for determining the position, orientation, shape and/or operational characteristic of an environment, comprising:

means for gathering data regarding at least one object forming the environment, wherein said means for gathering data includes a plurality of position sensors which sequentially sense the position of at least three non-collinear points on each object; and means for manipulating the data gathered by said means for gathering data so as to create a map of the environment.

12. A system as in claim 11, wherein said plurality of sensors operate in conjunction with at least two fixed stations to determine the position of an end of said rod corresponding to a position within the environment.

13. A system as in claim 2, wherein said computer contains an object library having reference shape and operational characteristic data for known objects, and wherein the data gathered by said means for gathering data is compared with the reference shape and operational characteristic data to identify an unknown object.

* * * * *